Patented Nov. 4, 1930

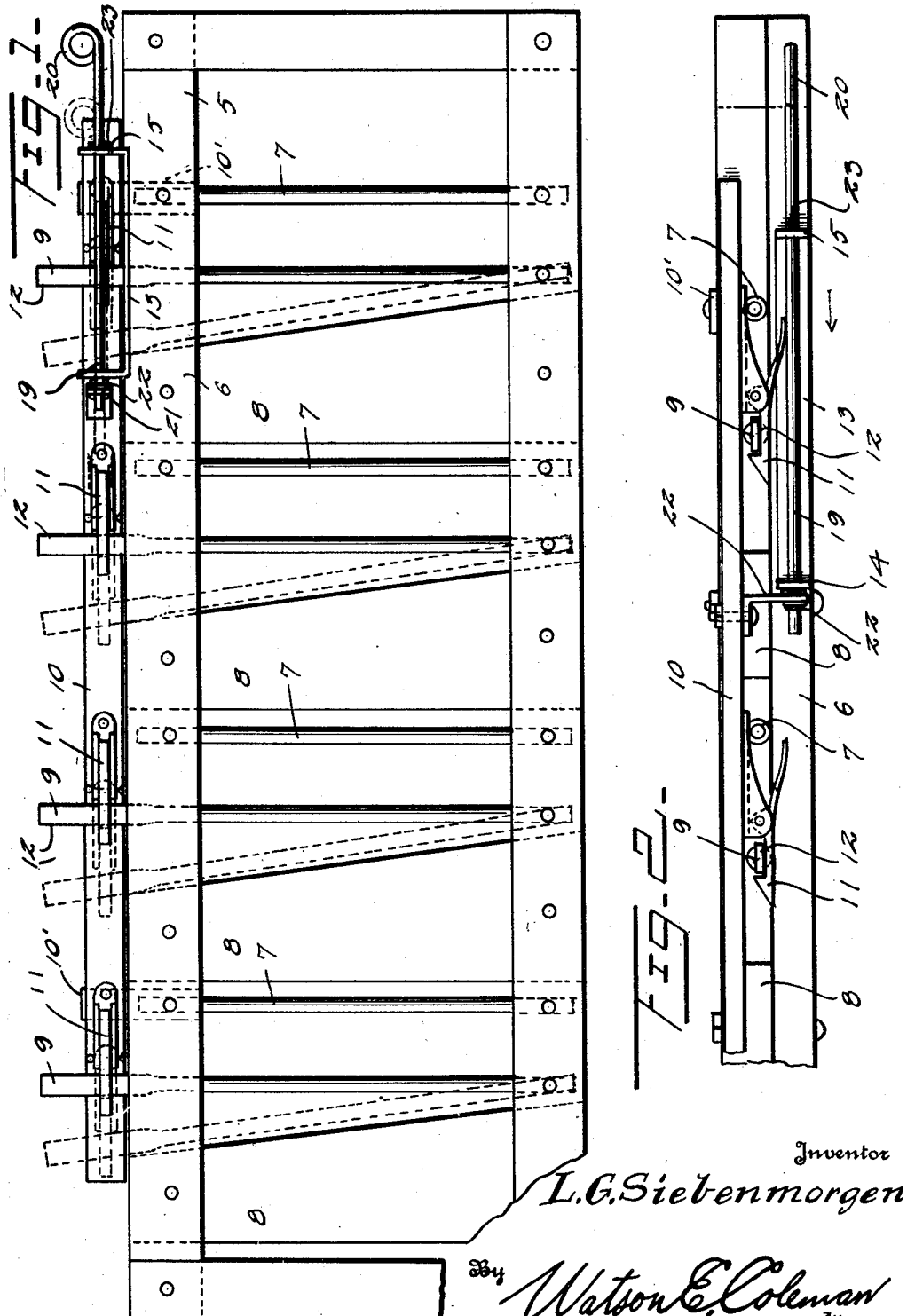

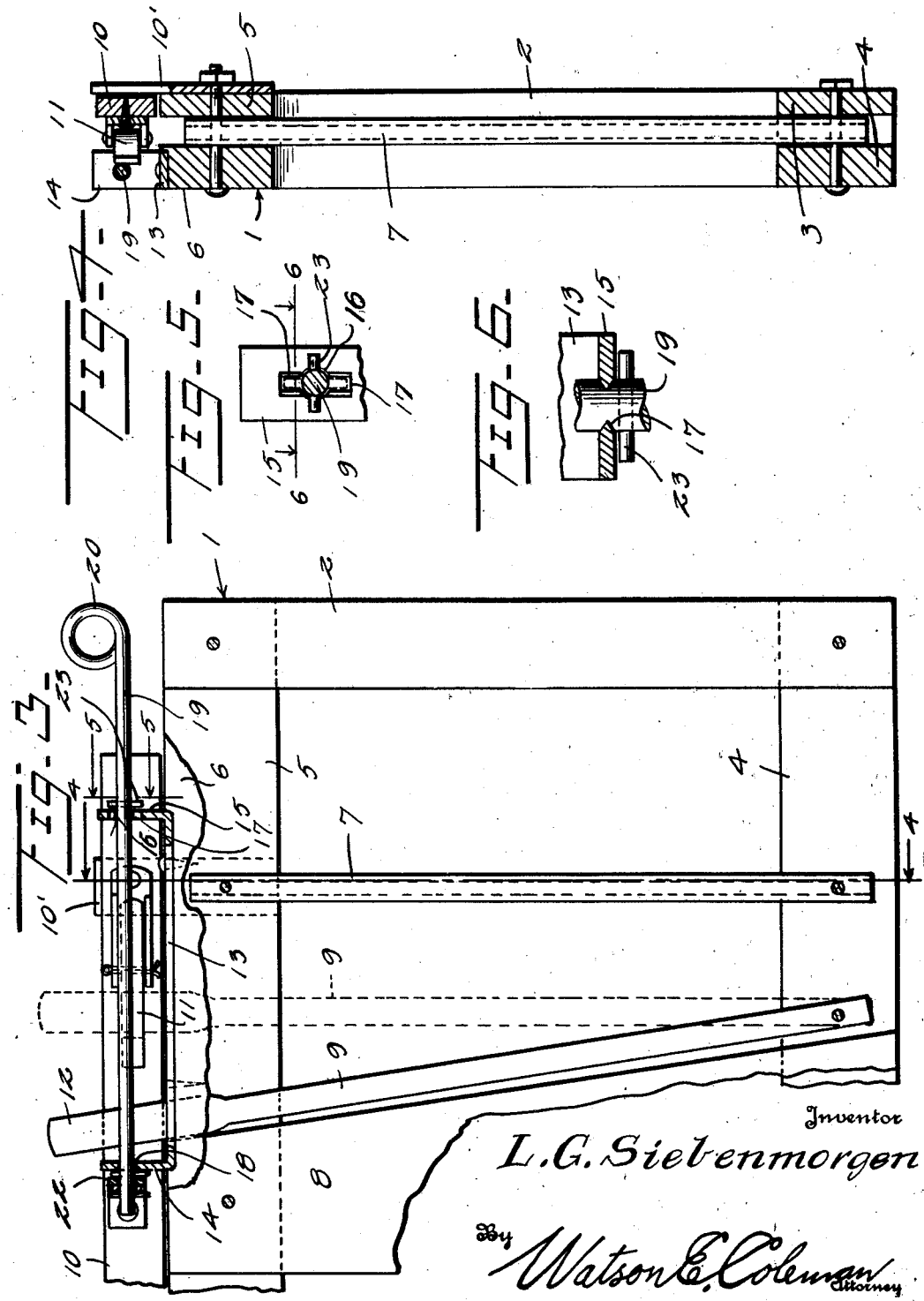

1,780,367

UNITED STATES PATENT OFFICE

LOUIE G. SIEBENMORGEN, OF HIAWATHA, KANSAS

STANCHION LATCH AND OPERATING MEANS THEREFOR

Application filed December 1, 1928. Serial No. 323,164.

This invention relates to cattle stanchions and the primary object of the invention is to provide, in a manner as hereinafter set forth, an improved bar lock and latch mechanism by means of which a plurality of stanchions may be closed and locked at one operation or individually locked or unlocked, as desired.

Another object of the invention is to provide a mechanism of the above described character which may be made strong and durable in construction and which may also be economically produced.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claim.
In the drawings:—

Figure 1 is a view in elevation of a plurality of stanchion structures equipped with the locking mechanism embodying the present invention;
Figure 2 is a view in top plan of one end of the structure shown in Figure 1;

Figure 3 is an enlarged elevational view of one end of the structure shown in Figure 1, showing parts of the latching mechanism in section;

Figure 4 is a sectional view taken substantially upon the line 4—4 of Figure 3;

Figure 5 is a sectional view taken substantially upon the line 5—5 of Figure 3, showing the latch rod turned to arrange the pin carried thereby in horizontal position;

Figure 6 is a sectional view on the line 6—6 of Figure 5.

Referring to the drawings in detail, the numeral 1 indicates as a whole the frame structure for a plurality of stanchions, the frame comprising as shown, the side upright bars 2, the bottom front and rear bars 3 and 4 respectively which connect the lower ends of the side bars, and the top front and rear bars 5 and 6 respectively which connect the upper ends of the side bars 2 and are arranged above the lower bars in parallel relation thereto in the usual manner.

As shown, the front and rear bottom bars are in spaced relation as are the top bars also and each stanchion comprises a fixed vertical bar 7 secured at its upper and lower ends between the upper and lower frame bars, a panel 8 arranged in spaced relation to the bar 7 and also secured at its upper and lower ends between the upper and lower pairs of bars of the frame structure, and a swinging bar 9 arranged between the bar 7 and the panel 8 and pivotally secured at its lower end between the lower bars 3 and 4 in the manner shown. The side edge of the panel 8 nearest the swinging stanchion bar 9 is inclined from the bottom upwardly away from the swinging stanchion bar 9 to provide a stop therefore when the upper end of this bar is swung over to move it from its normal vertical position, to permit an animal to extend its head through the stanchion.

As shown, the upper end of each shiftable stanchion bar is flattened and extended upwardly through the upper frame bars 5 and 6 between which it moves.

Slidably arranged upon the front upper frame bar 5 is a shiftable bar 10 held in position thereon by the guide plates 10' secured to the face of the bar 5 and extending upwardly over the outer face thereof and which carries upon its rear face a plurality of spring pressed latches 11 each of which is designed to engage over the flattened portion 12 of a shiftable stanchion bar.

At one end of the stanchion frame structure 1 there is mounted upon the rear top bar 6 a bracket 13 having the spaced upright ears 14 and 15. The ear 15 of the bracket as shown, is nearest the end of the frame structure and has formed therethrough a circular passage 16 which opens at diametrically opposite points into the recess 17. As shown in Figure 5, the opposed edges of this recess 17 are beveled from opposite faces of the ear.

The inner ear 14 also has an aperture 18 formed therethrough.

Extending longitudinally of the bracket 13 and through the apertures 16 and 18 is a latch bar 19 the outer end of which is looped to form a handle 20 while the inner end is detachably secured by nuts 21 or other appropriate holding members to the bracket 22 carried by the shiftable spring latch carrying bar 10.

From the description thus far given it will be seen that upon shifting the latch bar 19 longitudinally the shiftable bar 10 will also be moved longitudinally of the stanchion frame and each of the swinging stanchion bars 9 can be caused to move over to open stanchion position or to closed stanchion position as desired.

When the swinging stanchion bars 9 are in vertical or closed stanchion position they may be so held by a pair of lugs 23 carried by and projecting from the bar 19 at diametrically opposite points and extending across the outer face of the bracket ear 15 at right angles to the recess 17 through which they are adapted to pass when it is desired to shift the bars 10 and 19 to open all of the stanchions. It will be readily understood that when all of the stanchions are to be opened simultaneously the bar 19 may be turned to bring the lugs 23 into position to pass through the recesses 17 after which the bar 19 is shifted longitudinally to move the swinging stanchion bars in the manner previously described.

It will also be seen from the foregoing description that when the bar 19 is in latched position holding all of the stanchion bars 9 in upright or closed stanchion position, any one of the stanchions may be opened independently of the latch bar by manipulating the spring controlled latch 11 of the particular stanchion to release the bar 9 held thereby.

A stanchion structure controlled by a latching mechanism of the character embodying the present invention will materially assist a dairyman in his work for it will be readily seen that considerable time will be saved by opening all of the stanchions at one operation in the manner herein described instead of having to go to each stanchion to release the swinging bar thereof.

Due to the manner in which the recesses 17 of the ear 15 are formed, that is, by beveling the edges thereof from each face of the ear, the studs 23 carried by the latch bar 19 will be directed through the recesses without difficulty.

Having thus described my invention, what I claim is:—

The combination with a plurality of stanchions wherein each includes an upright swinging bar, of a reciprocable bar common to said swinging bars and extending transversely of the upper end of each, latch means on said reciprocable bar for detachably engaging each swinging bar for movement with the reciprocable bar, a supporting bracket mounted adjacent said reciprocable bar and having an aperture formed therethrough and further having lateral recesses opening into said aperture, a reciprocating latch bar extending through the aperture of said bracket and supported thereby, connecting means between the latch bar and the reciprocable bar, and studs carried by the latch bar designed to pass through said recesses to permit shifting of the latch bar and to engage against one face of the bracket when the latch bar is turned to prevent shifting thereof.

In testimony whereof I hereunto affix my signature.

LOUIE G. SIEBENMORGEN.